United States Patent [19]

Kassies

[11] Patent Number: 5,302,819
[45] Date of Patent: Apr. 12, 1994

[54] METHOD OF, AND APPARATUS FOR, DETECTING AN OBJECT

[76] Inventor: Michiel Kassies, 2 de Laurierdwarsstraat 10E, Amsterdam 1016 RB, Netherlands

[21] Appl. No.: 849,435
[22] PCT Filed: Sep. 17, 1990
[86] PCT No.: PCT/NL90/00134
 § 371 Date: May 15, 1992
 § 102(e) Date: May 15, 1992
[87] PCT Pub. No.: WO91/04499
 PCT Pub. Date: Apr. 4, 1991

[30] Foreign Application Priority Data

Sep. 15, 1989 [NL] Netherlands .................. 8902314

[51] Int. Cl.$^5$ .................................. G01V 9/04
[52] U.S. Cl. ........................... 250/222.1; 356/4
[58] Field of Search ............ 250/222.1, 221, 225, 250/203.2, 561; 356/4, 448, 446

[56] References Cited

U.S. PATENT DOCUMENTS

| | | | |
|---|---|---|---|
| 4,224,608 | 9/1980 | Lederer | 250/225 |
| 4,339,660 | 7/1982 | Buchholz | 250/225 |
| 4,659,922 | 4/1987 | Duncan | 250/222.1 |
| 4,701,049 | 10/1987 | Beckmann et al. | 356/4 |
| 4,716,298 | 12/1987 | Etoh | 250/222.1 |
| 4,721,384 | 1/1988 | Dietrich et al. | 356/4 |
| 4,734,575 | 3/1988 | Wagli et al. | 250/225 |
| 4,752,799 | 6/1988 | Stauffer | 356/4 |
| 4,812,643 | 3/1989 | Talbott | 250/222.1 |
| 4,814,810 | 3/1989 | Ishiguro | 356/4 |
| 4,816,667 | 3/1989 | Meinert | 250/222.1 |
| 4,847,488 | 7/1989 | Müller et al. | 250/225 |
| 4,851,661 | 7/1989 | Everett, Jr. | 250/222.1 |
| 4,935,613 | 6/1990 | Ishiguro et al. | 356/4 |

*Primary Examiner*—David C. Nelms
*Assistant Examiner*—K. Shami
*Attorney, Agent, or Firm*—Jacobson, Price, Holman & Stern

[57] ABSTRACT

A method of detecting an object, comprising the steps of generating radiation by means of a source of radiation; emitting the radiation in the direction of the object; and detecting a first radiation component at a first angle of deflection of substantially 180°; measuring a second component of the reflected radiation at a second angle of deflection and performing a first differential measurement between a first intensity signal representing the first radiation component and a second intensity signal representing the second radiation component. Also an apparatus for carrying out the method is described.

23 Claims, 9 Drawing Sheets

METHOD OF, AND APPARATUS FOR, DETECTING AN OBJECT

This invention relates to a method of detecting an object, comprising the steps of: generating radiation by means of a source of radiation; emitting the radiation in the direction of the object; and detecting a first radiation component at a first angle of deflection of substantially 180°.

The invention further relates to apparatus for carrying out the method.

Such a method and apparatus are disclosed in U.S. Pat. No. 4,339,660, and are used to detect the presence of the object in the detection field of the apparatus. In the known method and apparatus, light is emitted to a retro-reflecting mirror, and the light retro-reflected by the mirror is detected.

The known apparatus is of the type sometimes called "light barrier". Its operation is based solely on the interruption by a given object of a beam of radiation reflected at a fixed reflector, in which arrangement the detector does measure radiation when no object is present in the detection field, and does not measure or detect radiation when an object is present in the detection field, that is to say, when an object interrupting the light beam is present in the light path between the transmitter and the mirror and/or between the mirror and the receiver. The detected signal generated by the presence of the object can be processed further for control purposes, for example, to increase the position of a counter (for instance for monitoring production).

A disadvantage of the known method and apparatus is, however, that no selective detection of objects is possible, that is to say, that the presence of an object in the detector's detection field is detected irrespective of its nature and identity.

A further disadvantage of the known method and apparatus is that they only enable a yes/no detection of an object, that is to say, there is only a discrimination between a presence situation, in which the light beam is interrupted by an object, on the one hand, and an absence situation, in which the light beam is not interrupted by an object, on the other More specifically, the known method and apparatus do not enable detection of the position of the detected object.

There are also prior methods and apparatuses for detecting an object, in which the detection is based upon the reception of light reflected by the object to the detector, and in which the detector does not detect radiation when the object is absent. A disadvantage experienced in that arrangement is that the detector does not discriminate between the radiation reflected by the intended object, on the one hand, and ambient radiation and/or radiation reflected by any other objects, on the other, so that selective detection is not possible or not reliably possible.

Generally speaking, the above data obtained from the detected radiation are sufficient for detecting whether an object is present in the detection field of the apparatus, for example, for counting purposes or protection purposes. It may be desirable, however, to increase the accuracy of the detection. In case the system is to be used for counting purposes, a problem may be that a detected object, due to its shape, reflects the beam of radiation more than once in the direction of the detector, so that the counter position is increased by more than one by the object.

It may also be desirable to increase the selectivity of the detection. Thus, when the system is used for counting purposes, it may be desirable to detect certain objects and not to detect others. Also, for example, for robot vision or other automation applications, it may be desirable to detect a given object from a collection of different objects. This is not possible with the data obtained by the prior methods, because these data do not contain information about the identity of the detected object. Moreover, it is possible that the measurement is disturbed by ambient radiation and/or by radiation reflected at spurious objects.

This can be solved by analyzing the spectral contents (colour) of the reflected signal, but colour recognition is not generally a water-tight method of detecting objects.

It is also possible to use pattern recognition for detecting the shape and/or orientation of the object, but this requires a particularly complex method.

In order that objects may be selectively detected or identified by means of a method of the above type, it is known for the object to be provided with information encoded in the form of contrasting stripes (bar code). The bar code is scanned, and the detected information is processed further, for example, for production monitoring during a production process, or in an automatic cash register in a shop. This method, however, is unsuitable for detecting or identifying objects from a large distance, for one thing because ambient light and spurious reflections at objects other than the bar code to be detected provide a larger detection signal than the radiation reflected at the bar code.

A method of the above type is further used in eye measurements, for example, for analyzing the orientation of the eyes relative to the head of a subject in an experimental set-up, in order to determine the direction in which the subject is looking. Here again, trouble is experienced from spurious radiation from the surroundings, or spurious reflections. It is known that in eye examination, these problems can be reduced by using a high intensity of radiation, which, however, may be unsafe in eye measurements and may be experienced as uncomfortable by the subject.

It is an object of the present invention to overcome the drawbacks and disadvantages outlined above.

More specifically, it is an object of the present invention to provide a method which makes it possible for objects having at least partially a retro-reflecting property to be selectively detected.

It is a further object of the present invention to provide a method which makes it possible for the position and/or movement of such an object to be detected.

It is a still further object of the present invention to provide a method which makes it possible for a code carried by such an object to be read from a relatively large distance.

To that effect, the method according to the present invention is distinguished from the prior method in being characterized by measuring a second component of the reflected radiation at a second angle of deflection equal to, or virtually equal to, 180°; and performing a first differential measurement between a first intensity signal representing the first radiation component and a second intensity signal representing the second radiation component.

The two intensity signals can be obtained by means of one detector and one source of radiation, said one detector and/or said one source of radiation being continually displaced from a first position in which the first intensity signal is obtained to a second position in which the second intensity signal is obtained. It is also possible for the two intensity signals to be obtained by means of one detector and two sources of radiation, or by means of one source of radiation and two detectors. This offers the advantage that a differential signal can be calculated continuously.

The retro-reflection property may be an intrinsic retro-reflection property of the object to be detected itself, or a retro-reflection property of a reflective means, which for example may be a marker carried by the object. The reflective means will preferably be composed so that its reflection property contrasts with the reflection properties of the surroundings.

This will result in the provision of an accurate detection signal having an effective signal-to-noise ratio.

Further features and advantages of the invention will become clear from the following description of preferred embodiments of the apparatus and method according to the invention, read with reference to the accompanying drawings. In said drawings, FIGS. 1A-C show diagrams illustrating specific features of mirror reflection, diffuse reflection and retro-reflection, respectively;

FIGS. 1D-F show diagrams of set-ups of detectors relative to a radiator in preferred embodiments of an apparatus according to this invention;

Figure 1A:
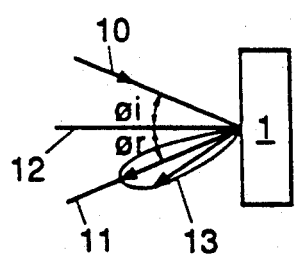
FIG. 1G shows a wiring diagram of an apparatus for performing a continuous differential measurement.

Referring to the drawings, FIG. 1A shows a diagrammatic illustration of reflection at an object 1 which at least in the plane of drawing is mirror-reflecting. An incident light ray 10 is reflected in a reflected light ray 11, the angle $\phi i$ between the axis of the incident light ray 10 and the normal 12 of the object 1 being equal to the angle $\phi r$ between the axis of the reflected light ray 11 and said normal 12. Because in practice the object 1 will not be an ideal mirror-reflecting object, the reflected light ray 11 will exhibit a certain spread and thus form a light beam, with the intensity of the radiation decreasing with increasing angular distance from the axis of the reflected light beam 11, as shown by the curve 13, which is a schematic representation in pole coordinates of the intensity as a function of the direction.

Figure 1B:
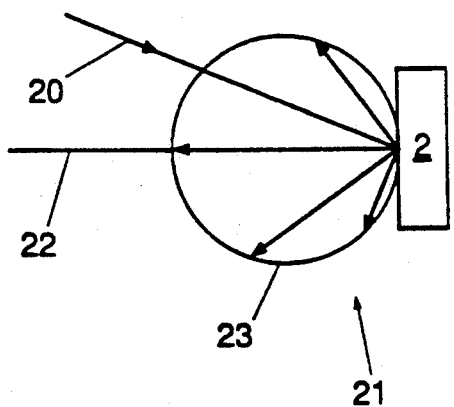

FIG. 1B shows a schematic representation of reflection at an object 2 which, at least in the plane of drawing, is diffusely reflecting. An incident light beam 20 is reflected, and the reflected beam 21 is symmetrical relative to the normal 22 of the object 2, with the intensity of the radiation being virtually angle-independent in a large area around the normal 22, as shown by curve 23.

Figure 1C:
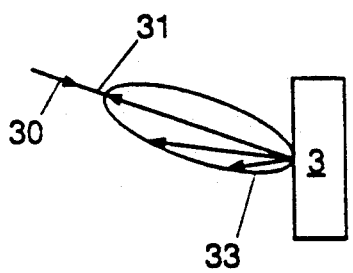

FIG. 1C shows a diagrammatic representation of reflection at an object 3 which, at least in the plane of drawing, is retro-reflecting. An incident light beam 30 is reflected into a reflected light beam 31, with the axis of the incident light beam 30 coinciding with the axis of the reflected light beam 31. Because in practice the object 3 will not be an ideal retro-reflecting object, the reflected light beam 31 will exhibit a certain spread, with the intensity of the radiation decreasing rapidly with increasing angular distance from the axis of the retro-reflected light beam 31, as shown by the curve 33.

It is noted that it is possible that an object has two different ones of the above reflection properties in two directions perpendicular to each other.

Figure 1D:
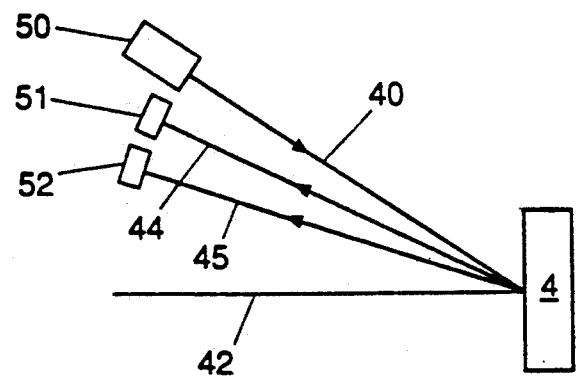

FIG. 1D shows how it can be determined in a simple manner according to this invention whether an object 4 has the reflection property of retro-reflection on the one hand, or mirror-reflection or diffuse reflection on the other hand. A source of radiation 50 transmits a light beam 40 to the object 4. In the vicinity of the axis of the light beam 40, two detectors 51 and 52 are arranged, with the distance of detector 52 from the axis of the light beam 40 being somewhat greater than the distance of detector 51 from the axis of light beam 40. The angle $\alpha 2$ at which the radiation detected by detector 52 is deflected (being the angle between beam 40 and beam 45) is somewhat smaller than the angle $\alpha 1$ at which the radiation detected by detector 51 has been reflected, with $\alpha 1$ being approximately 180°. When the intensity of the radiation detected by detector 51 is higher than that of the radiation detected by detector 52, independently of the orientation of object 4 relative to the axis of light beam 40, object 4 is a retro-reflecting object.

It will be clear that the rotation through 180° here detected relates to rotation about at least one of the axes X, Y which are mutually perpendicular and perpendicular to the direction of transmission, and located in or near the reflecting surface. With a linear and radial disposition of the detectors 51 and 52, as shown in FIG. 1D, it will be possible for a retro-reflector rotating about a single axis X, Y to be selectively detected depending on the relative orientation of the retro-reflector around the axis (z) of the light beam 40 and the linear orientation of detectors 51 and 52. Such a retro-reflector consists, for example, of mirror-reflecting material with a surface exhibiting one or more parallel straight grooves each having two flat and mutually perpendicular walls. Retro-reflectors formed of so-called glass bead reflectors or cube corner reflectors, however, will be detected no matter their orientation around the z axis.

When the object 4 is a mirror-reflecting object, the radiation detected by detectors 51 and 52 will be equal to zero, except for the particular case where the source of radiation 50 and detectors 51 and 52 are in the vicinity of the normal 42 of the object 4: in that case the reflected light beam may just hit either of the detectors 51 or 52;

In practice, however, when detectors 51 and 52 are close enough together, the difference in detected intensity may yet be small or even zero. This may be caused, for example, by the occurence of a plurality of random reflections in the vicinity of the normal of a mirroring object (and partly as a result of some inevitable temporal integration).

When object 4 is a diffusely-reflecting object, the radiation detected by detector 51 will be substantially equal to the radiation detected by detector 52, irrespective of the polarization or angle of incidence of the light emitted.

Figure 1E:
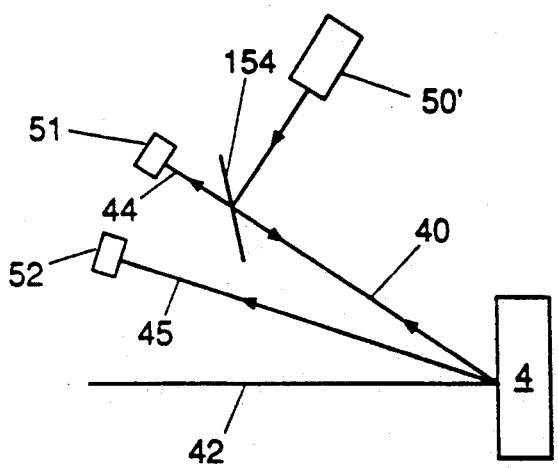

When it is desirable for angle $\alpha 1$ to equal 180°, the source of radiation 50 can be replaced by a combination of a radiation source 50' and a beam splitter 154, as shown in FIG. 1E. The reflected beam 44 is here reflected through 180°. In this way, detection of an ideal retro-reflector is possible, too.

Figure 1G:
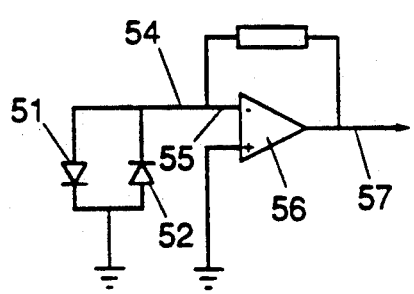
Figure 1F:
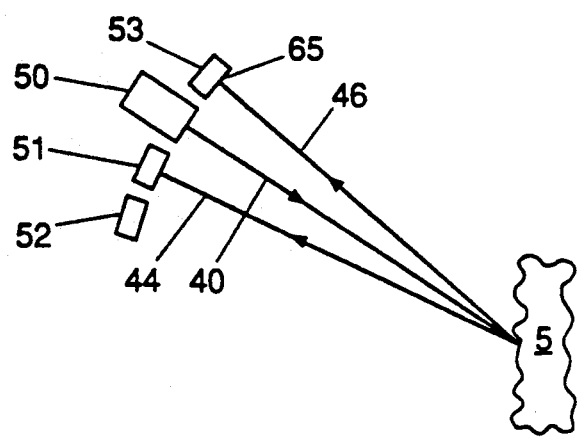

FIG. 1F illustrates a simple manner in which it can be determined, according to this invention, whether an object 5 has one of the reflection properties of retro-reflection, mirror-reflection or diffuse-reflection. In order for a mirror-reflecting object to be detected, a linearly-polarized light beam 40 is transmitted from source of radiation 50 to the object. In the vicinity of the axis of light beam 40, two detectors 51 and 53 are disposed, which are each equally sensitive to non-polarized light. However, as a result of a polarization filter 65, detector 53 has a lower sensitivity, relative to detector 51, to light rotated about the z axis through approximately 180° relative to light beam 40.

When the intensity of the radiation detected by detector 51 is higher than the intensity of the radiation detected by detector 52, the object is a mirror-reflecting object, no matter the orientation of the object relative to the polarization of the light beam 40 and irrespective of the kind of material the object is made of. In case of mirror-reflection a polarization present in the indicent light is "maintained" only in the case of near-normal incidence, which is here the sole case of mirror-incidence detectable. "Maintained" here refers to confinement within a plane and means actually reversal through rotation about 180° around the z-axis.

An extra and selectively detectable feature can be added to a mirror-reflecting object as will be described in more detail hereinafter with reference to FIG. 3.

It will be clear that a combination of the differential signals between the output signals of detectors 51 and 52 and that of 51 and 53 is representative of the nature of the reflection from object 4 with regard to mirror, retro, or diffuse reflection, whereby the possible effect of ambient light is also eliminated.

It will also be clear that such a representative differential measurement can also be carried out when one detector is present and two sources of radiation, and also when one detector and one source of radiation are present, in which arrangement the detector and/or the source of radiation are somewhat displaced after the first measurement.

The embodiment illustrated in FIGS. 1D-1E offers the advantage that the differential signal between the output signals of detectors 51 and 52 can be obtained in a simple manner when radiation-sensitive diodes are used for these detectors. FIG. 1G shows a diagram of a circuit with which this is achieved. In this arrangement, photo diodes 51 and 52 are anti-parallel-connected with each other with one common terminal 54 being connected to an input 55 of an intensifier 56. Equal contributions of photo diodes 51 and 52 compensate each other, and cause no signal at the output 57 of intensifier 56. Only a difference in the contributions of photo diodes 51 and 52 causes a signal at the output 57 of intensifier 56.

In the case of retro-reflection, a polarization present in the incident light beam is maintained in a number of cases (for example, when the retro-reflecting body consists of mirror-silvered cube angles), while in other cases there can be elimination of any polarization present in an incident light beam.

Figure 2:
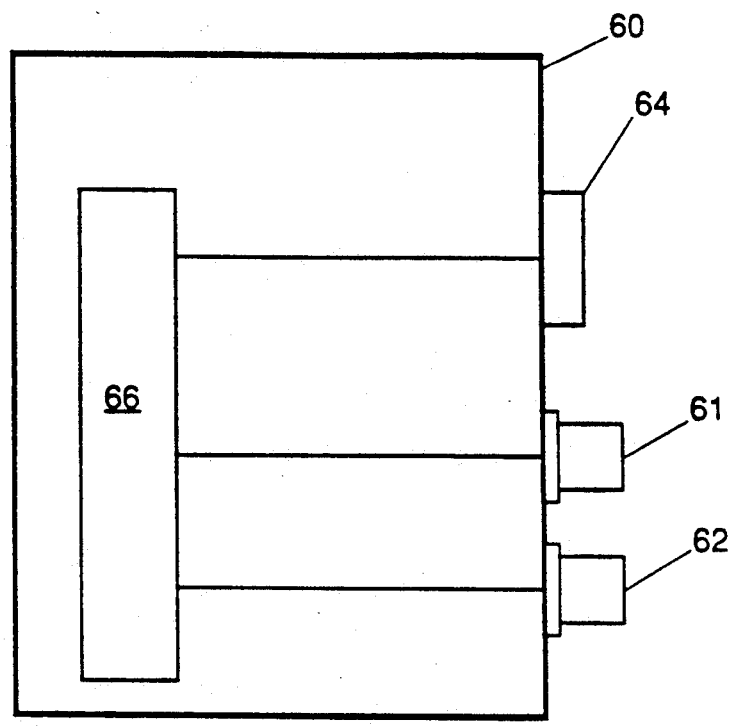
FIG. 2 shows a diagrammatic side-elevational view of an apparatus according to this invention for detecting the spatial distribution of reflected radiation.

FIG. 2 shows an apparatus, generally indicated at 60, which makes it possible for this further information to be obtained. The apparatus 60 comprises two sources of radiation 61, 62 and a radiation detector 64, mounted in co-planar relationship. Sources 61, 62 emit radiation, for example, visible light, and in the example shown are laser diodes.

Light sources 61, 62 and detector 64 are connected to a control device 66, which controls light sources 61, 62 so that they emit light one after the other, and which receives an output signal generated by detector 64 in response to the radiation detected.

To produce a first signal $\phi 1$ of radiation deflected through a first angle approximating 180°, control device 66 actuates light source 61. The latter is so close to detector 64 that radiation retro-reflected by an object not shown can be detected by detector 64.

To produce a second signal $\phi 2$ of radiation deflected through a second angle somewhat smaller than the first angle, control device 66 actuates light source 62. The latter is further removed from detector 64, so that any retro-reflected radiation is not detected by detector 64, or at any rate to a lesser extent.

In this arrangement, the contribution of diffusely-reflected light or ambient light to signal $\phi 2$ is essentially equal to the contribution to signal $\phi 1$, so that the differential signal $\phi 21 = \phi 2 - \phi 1$ will be representative of the amount of retro-reflected radiation. Thus a retro-reflector can be selectively detected.

It will be clear that an optimum result is obtained by adapting the geometry and relative dimensions of elements 61, 62 and 64 to the retro-reflected light beam to be detected.

With a first simple trial set-up according to the invention, it was possible, for example, for the retro-reflections from for example eye pupils to be detected in a detection field approximately 1 m² in size, illuminated with daylight. The interruption of the detected signal $\phi 21$ corresponded to the absence of the eye, as caused, for example, by the movement of the eye lid across the eye. The apparatus was therefore suitable for use as a sleep detector Fluctuations in retro-reflection efficiency occur, for example, as a result of pupil contractions and the movement of the focal point across the vain pattern on the eye bottom during eye movements. Recognizable fysiological information, vibrations, patterns and movement can thus be detected from a distance.

Figure 3:
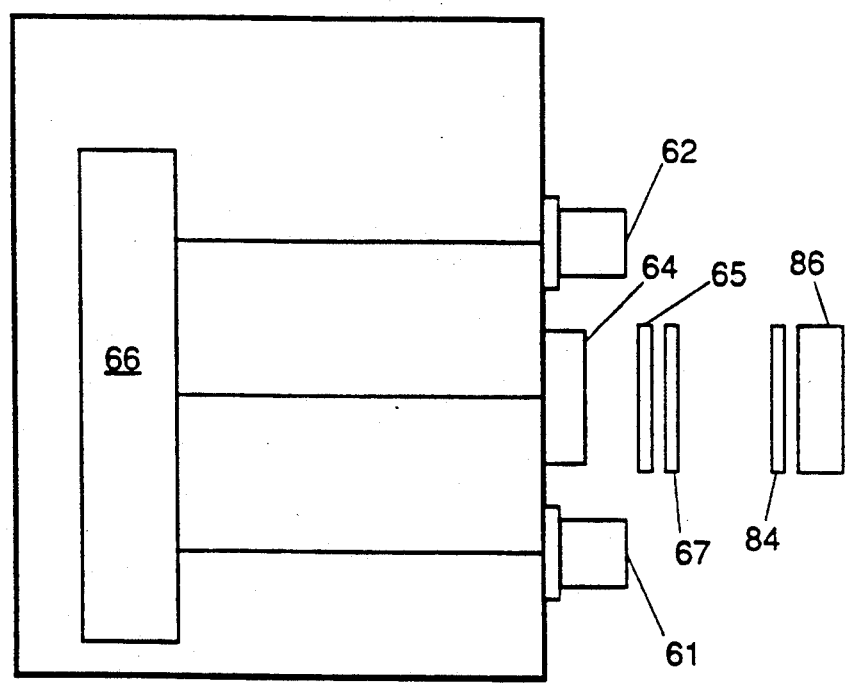
FIG. 3 shows a diagrammatic side-elevational view of a different apparatus according to this invention for detecting the spatial distribution of reflected radiation.

In the further embodiment shown in FIG. 3, a linear polarization filter 65 is provided ahead of detector 64, so that the only radiation which reaches detector 64 is that whose direction of polarization is parallel to the direction of transmission of filter 65. In front of filter 65, a ¼λ platelet 67 is provided, with the optical axis of the ¼λ platelet 67 making an angle of 45° with the direction of transmission of polarization filter 65. In this example, sources 61, 62 radiate linearly polarized radiation, and sources 61, 62 are so oriented relative to polarization filter 65 that the direction of polarization of the light emitted by source 61 is parallel to the direction of transmission of filter 65, and that the direction of polarization of the light emitted by source 62 is perpendicular to the direction of transmission of filter 65. Like the apparatus shown in FIG. 2, this apparatus permits receiving retro-reflection, but the apparatus is now selectively sensitive to reflections with a pre-determined polarization transformation. Light polarized to the left shines through filter 5 on detector 64, whereas light polarized to the right is absorbed in filter 65. Linearly polarized light, such as unchanged or mirror-reflected light, is transformed by the ¼λ platelet 67 to circular light, which is transmitted by filter 65 at half intensity to detector 64, no matter the direction of polarization of light source 61, 62, so that in this case the signal $\phi 1$ will be substantially equal to signal 2 for mirror-reflection as well as for diffuse-reflection and retro-reflection. It is only when the reflector carries out a polarization transformation of linearly polarized light to circularly polarized light that the differential signal $\phi 12$ will differ from zero. A surface capable of effecting such a transformation is, for example, a mirror-reflecting surface of, for example, aluminium provided with a transparent coating of an optical thickness of, for example, ¼λ, for example, of stressed cellophane.

A reflecting object, which can thus be selectively detected, preferably has the optical axis of the ¼λ material oriented in one plane parallel to the optical axis of the ¼λ platelet 67. Any rotation of the object or the ¼λ material through about 90° is recognizable from a reversal of the differential signal $\phi 12$. This reversal of signal can be used to advantage, depending on the application, for the detection of, for example, false alarm, object rotation, and the like.

It will be clear that this result can also be obtained by providing the ¼λ platelet 67 before light sources 61, 62 instead of before detector 64 and filter 65. When the ¼λ platelet 67 is omitted, the apparatus of FIG. 3 only detects mirror-reflections from an object without a ¼λ platelet, whereas an opposite differential signal will be obtained upon the detection of a mirror-reflecting object provided with a ¼λ platelet In FIG. 6, an application thereof is elaborated.

The variants of the invention illustrated in FIGS. 2 and 3 respectively analyse ideal light reversal about and along the Z axis and deviation thereof by means of, respectively, differentiation of axial-shifted radiation components and differentiation of radial-shifted (polarized) radiation components, which relate to rotation of radiation emitted along a Z axis around the X, Y axis and the Z axis, respectively.

The combination of two or more detection variants according to this invention provides an exponentially higher selectivity and insensitivity to spurious effects.

Generally speaking, the specific design of the detector is optimally adapted to the pre-determined reflection property. One example in which this can be applied is the reading of code.

Figure 4A:
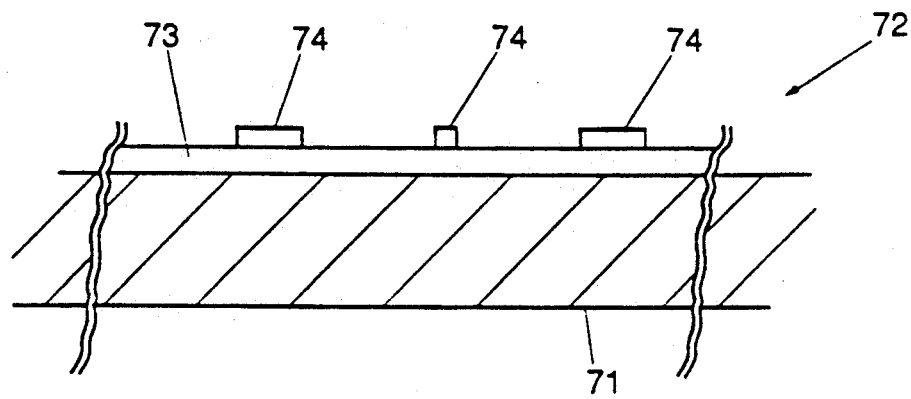
FIG. 4A is a part-sectional view of an identification strip according to this invention, carried by an object to be detected.
Figure 4B:
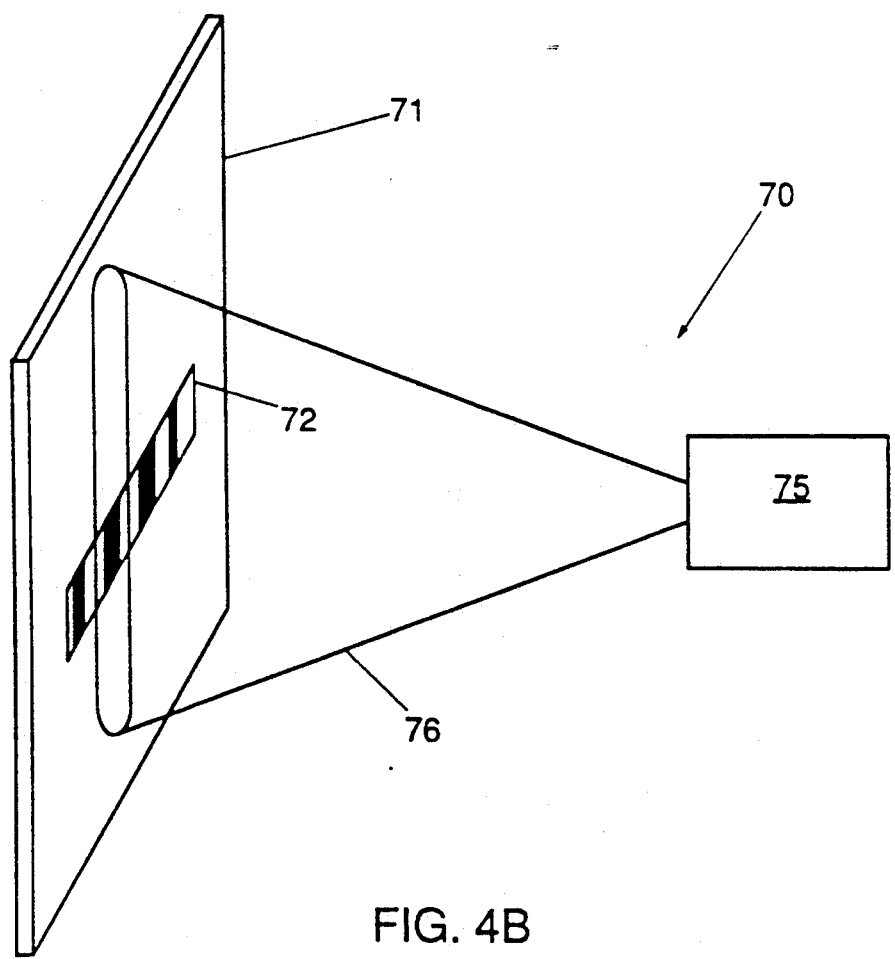
FIG. 4B shows a diagrammatic elevational view of an apparatus for detecting the identification strip of FIG. 4A.

FIGS. 4A, 4B diagrammatically show an improved apparatus 70 according to this invention for detecting an object 71, which apparatus is excellently suitable for reading a graphic code 72 carried by object 71 from a distance. The graphic code 72 is provided on a background of a (retro-)reflecting material 73.

FIG. 4A shows a longitudinal sectional view of the graphic code 72. A strip of retro-reflecting material 73, which according to the invention may be relatively narrow, for example 1 mm, black surface portions 74 are provided with ink The width and spacing of the portions 74 represent, via a certain code which for the sake of simplicity will not be discussed further herein, the information content of the graphic code 72. The retro-reflecting material 73 may have any composition suitable for the purpose.

Provided in a housing 75 is a light source which by means of suitable optics not shown transmits a narrow light beam 76 In detecting an object 71, light beam 76 is directed with the smallest dimension thereof in the longitudinal direction of strip 73 on to the graphic code 72, and the beam is moved in a direction with a component parallel to said longitudinal direction of strip 73 for scanning the graphic code 72. The smallest dimension of the light beam, shown excessively large in FIG. 4B, may be about 0.1 mm. Also arranged in housing 75 are two detectors. The disposition of the light source and the detectors corresponds to the arrangement described with reference to FIGS. 1D-E and will not be described further herein. It is only when the beam 76 hits strip 73 that the signals detected by the two detectors are different. When the beam 76 hits one of the portions 74, no light is retro-reflected, so that the signals detected by the two detectors are equal. Accordingly, the differential signal between said signals fluctuates in accordance with the code represented by the portions 74 and can be processed further. The precise orientation of object 71 relative to the light source and the position of strip 73 in beam 76 are of no effect in this connection. Thus a complete field is scanned in a single movement.

Figure 5A:
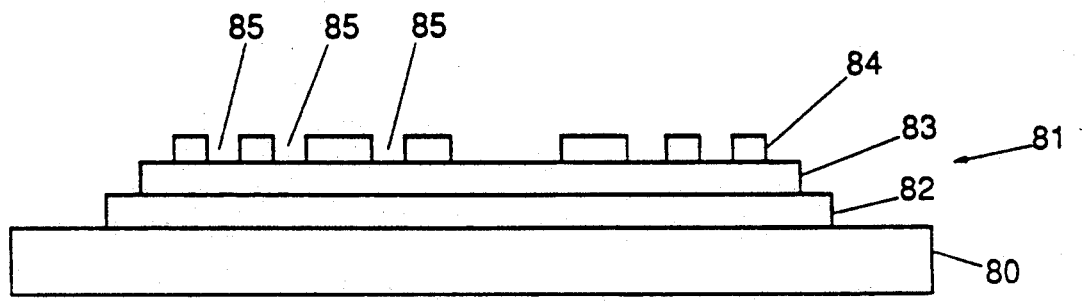
FIG. 5A is a part-sectional longitudinal view of a different embodiment of an identification strip according to the invention, carried by an article to be detected.
Figure 5B:
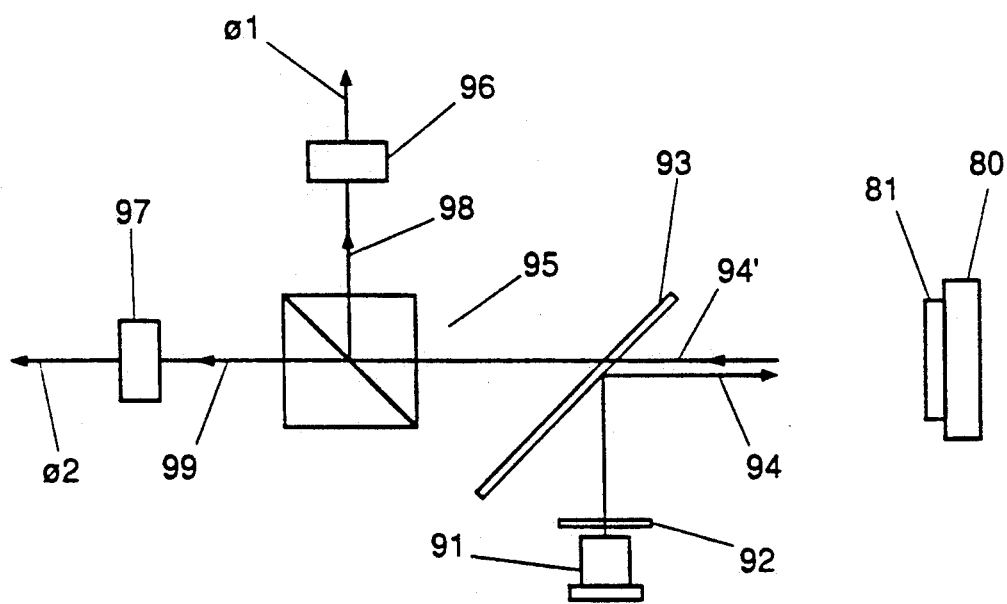
FIG. 5B is a diagrammatic elevational view of a preferred embodiment of an apparatus according to the invention suitable for detecting the identification strip of FIG. 5A.

A different embodiment of the detection apparatus according to this invention is shown in FIGS. 5A, 5B. FIG. 5A shows a longitudinal sectional view of an identification strip 81 comprising a coating of retro-reflecting material 82 and applied to an object 80. Superimposed upon coating 82 is an uninterrupted layer 83 with an optical thickness of ¼λ. Superimposed upon layer 83 is a layer 84 with an optical thickness of ¼λ. The ¼ layer 84 is provided with cut-outs 85, the width of, and spacing between, which represents the encoded information. The optical axes of the ¼λ layer 84 are directed parallel to the optical axes of the ¼λ layer 83. When circularly polarized light hits the identification strip 81 on the ¼λ layer 84, the reflected light when exiting has traversed a total optical thickness of ¾λ, and accordingly has been linearly polarized in a direction making an angle of 45° with the optical axis of layers 83, 84. When, on the other hand, circularly polarized light hits the identification strip 81 at the cut-outs 85 in the ¼λ layer 84, i.e., direct on the ¼λ layer 83, the reflected light has traversed a total optical thickness of ¼λ and accordingly has been linearly polarized in a direction making an angle of −45° with the optical axes of layers 83, 84, or perpendicular to the first direction. The two reflected beams accordingly are polarized at right angles to each other, which provides a well-detectable contrast for detecting the information stored in the width and relative distances of cut-outs 85.

FIG. 5B shows a diagrammatic cross-sectional top view through an apparatus 90 suitable for use in cooperation with the above-described material. The apparatus 90 comprises a linearly polarized light source 91 provided with a ¼λ platelet 92, so that the light beam 94, which leaves the apparatus 90 via a first beam splitter 93 of a non-polarizing type, is circularly polarized. Apparatus 90 comprises suitable optics not shown, serving to give light beam 94 the narrow form described with reference to FIG. 4. The apparatus 90 further comprises a second beam splitter 95 and two detectors 96 and 97 disposed so that reflected light 94' impinging upon the first beam splitter 93 in a direction opposite to that of the exiting light beam 94 is partly transmitted to the second beam splitter 95 and is split by the second beam splitter 95 into a sub-beam 98 impinging upon detector 96 and a sub-beam 99 impinging upon detector 97. For the sake of clarity, beam 94' has been somewhat shifted relative to beam 94 in the figure.

The second beam splitter 95 is of the polarization-analysing type so that horizontally polarized light is reflected to detector 96 and vertically polarized light is transmitted to detector 97.

When beam 94 impinges upon object 80, which is so disposed that the optical axes of layers 83, 84 make an angle of 45° to the main directions of the second beam splitter 95, the reflected radiation from parts 84 and interspaces 85 will respectively impinge upon one or the other detector 96, 97. Incident light having a different origin from the radiation 94' reflected by the identification strip 81 will be randomly polarized or non-polarized and, on average, cause an approximately equally large output signal φ1 or φ2 at detectors 96 and 97. The differential signal φ21 between the two output signals φ2, φ1 accordingly comprises the information represented by the identification strip 81, whereby the differential signal φ21 changes in polarity during the scanning of the identification strip 81 with light beam 94, which ensures an effective signal-to-noise ratio.

One suitable application thereof is, for example, the identification of an invisible or transparent code which may be provided on a retro-reflecting background, such as on a motorcar license plate for vehicle identification.

Figure 6A:
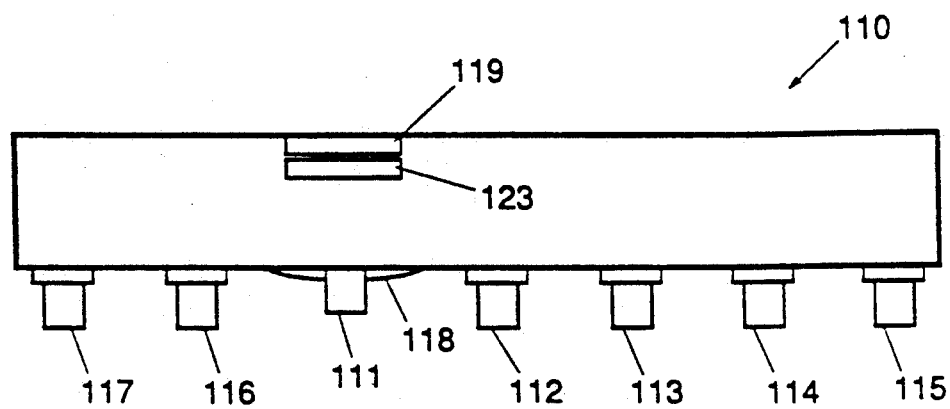
FIG. 6A is a diagrammatic elevational view of a preferred embodiment of an apparatus according to the invention for detecting the orientation of an eye.
Figure 6A:
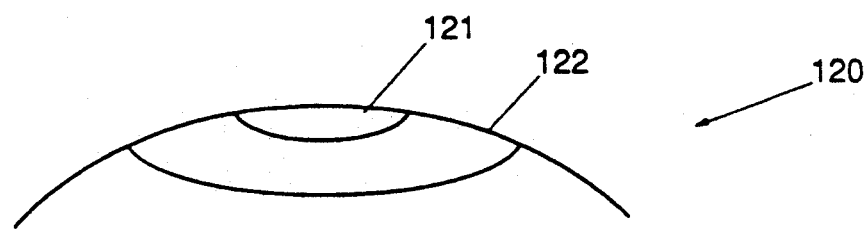

FIG. 6A shows in top plan view an apparatus 110 suitable for detecting the orientation of an eye 120. The apparatus 110 comprises light sources 111–117 and an annular lens 118 arranged around light source 111. Light transmitted by light source 111, which is deflected through an angle of about 180°, is projected by the annular lens 118 onto the image sensor 119. The image sensor 119 may be a CCD camera or a position detecting sensor; the latter offers the advantage that its output signal continuously displays the detection site on the image sensor 119, and that limitation due to pixel size and scanning frequency, as occur with a CCD camera are avoided. The light sources 111–117 transmit linearly polarized light with the polarization of light sources 111, 112, 114, and 116 being parallel to each other, and the polarization of the light sources 113, 115 and 117 perpendicular thereto. In a comparable manner to that described with reference to FIG. 2 or 3, light sources 111, 112 and 113 are actuated one after the other to form an image of the eye 120 on image sensor 119. A polarization filter 123 placed in front of the detector has an opposite position to the polarization of light source 113 and is parallel to the polarization of light source 112. Simultaneously with light sources 112 and 113, the light sources 116 and 117, respectively, which are arranged mirror-symmetrically relative to light source 111, are actuated to provide for a uniform and symmetrical illumination of eye 120 corresponding with the uniform and symmetrical illumination of eye 120 by light source 111. By a control device not shown, the images produced by irradiation with light sources 112 and 111 are subtracted one from the other. The differential image is representative of the position of the retroreflecting pupils 121 of the eye 120.

Furthermore, the control device subtracts the images obtained by irradiation with light sources 113 and 112 from each other; the differential image is representative of the position of the mirror-reflection of the radiation from light source 112 in the surface of the cornea 112 of the eye 120, and provides an indication of the position of the eye ball.

The differential vector between the two positions is indicative of the orientation of the eye 120, when the distance between the eye 120 and detector 110 is known. To determine said distance, a measurement is made with light sources 114 and 115. When the images obtained by irradiation with light sources 114 and 115 are subtracted from each other, too, a differential image is formed which is representative of the position of the mirror-reflection in the surface of the cornea 122 of eye 120. However, this differential image is slightly shifted relative to the differential image obtained by means of light sources 112 and 113. The size of this shift is a measure for the distance of the eye 120 from detector 110: the greater the shift, the shorter said distance.

Figure 6B:
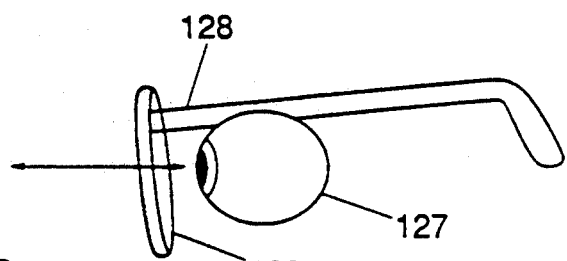
FIG. 6B is a diagrammatic side-elevational view of a pair of spectacles for use in eye measurement according to the invention.

FIG. 6B shows a side-elevational view of a pair of spectacles 128 with a λ/8 platelet 129 as a glass, which can be used to advantage in measuring eye movement at some distance from the subject and in a relatively large detection field. This gives the eye 127 an extra characteristic, by means of which eye reflections can be distinguished from other reflections, sometimes referred to as glow lights (from hair and the like), similar to the detection of the code of FIG. 5A. The (unintentional) detection of a glow light at the back of the "glass" proper is adequately avoided by a selected planar or somewhat convex shape of such rear surface.

Figure 6C:
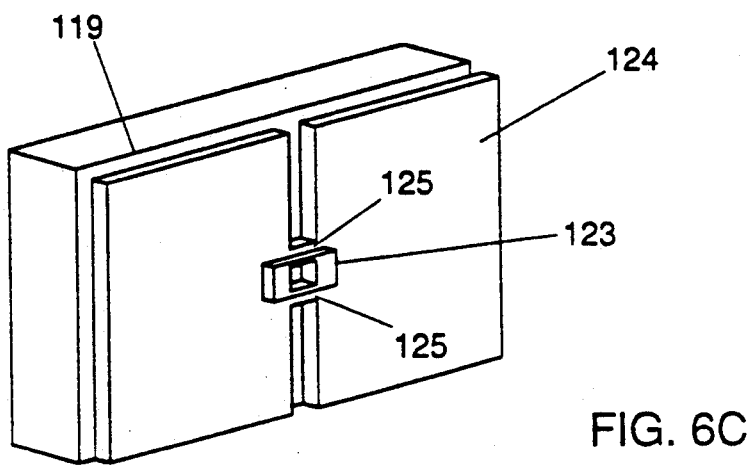
FIG. 6C is a diagrammatic elevational view of a mask according to the invention for use in the apparatus shown in FIG. 6A.

A special embodiment of an eye movement detector as shown in FIG. 6A uses a position detecting sensor provided with a mask 124 adjacent to the sensor surface, and a small polarization filter 123 (FIG. 6C). In this apparatus, the signal-to-noise ratio of the detection signal is highly favourable irrespective of whether spectacles are used. The pupil image is projected by means of lens 118 on a central part of the position sensor 119 in the space between the two halves of mask 124. Any second pupil image to the left or right of the pupil image first mentioned is screened off by mask 124 and excluded from detection. Reflections from the eyelid borders and the like is also excluded from detection, as the polarization filter is only provided across a limited central portion of the sensor, namely, there where the pupil is projected. Two horizontal mask bars 125 prevent the incidence of light on the sensor through an edge of the polarization filter. The mask bars 125 also mask the upper or lower edge of the pupil image, to prevent such spurious effects as would occur as a result of an eyelid moving slightly over the pupil. The long vertical shape of the mask apertures provide that an eye can be detected in a wide field by means of just a single horizontal movement. For this purpose, there is preferably used a movable mirror in the light path, which mirror is provided with a servo mechanism controlled by the pupil position signal from the position detector (not shown). As a result, a (moving) pupil is permanently and automatically projected on the central and polarization-sensitive part of the position sensor.

Figure 7A:
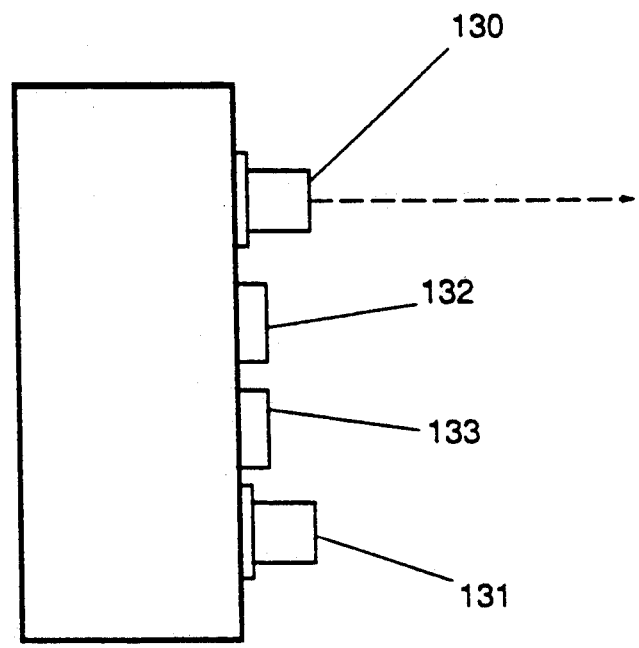
FIG. 7A illustrates an embodiment of a retro-reflection meter according to the invention.
Figure 7B:
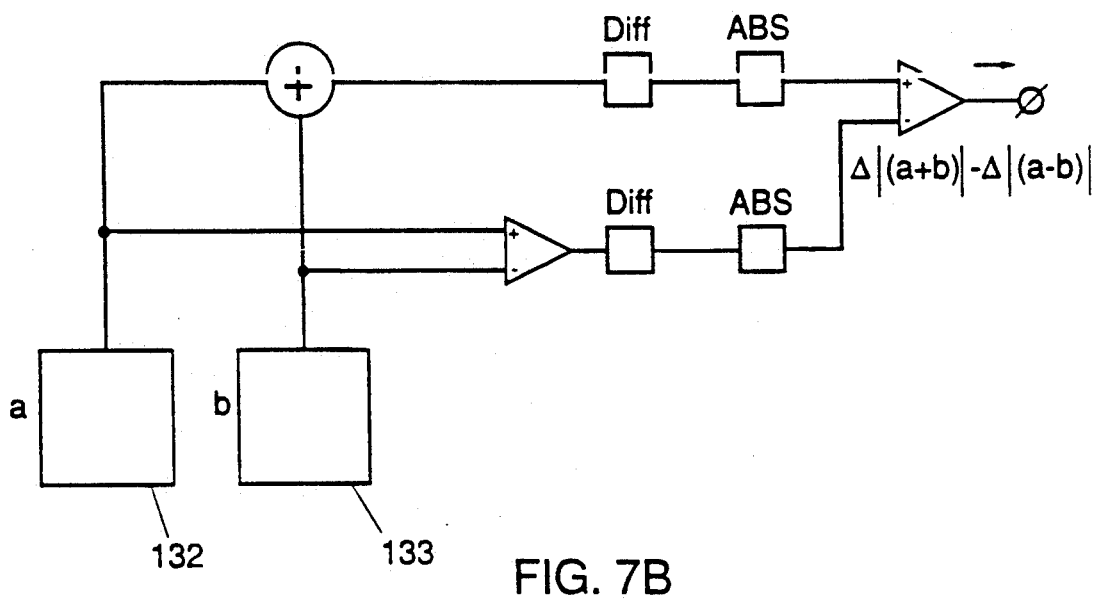
FIG. 7B shows a circuit diagram for combinatory signal processing according to this invention.

In retro-reflection detection, an undesirable differential signal or "false alarm", may occur as a result of parallax, movement or, for example, "offset" in the signal processing. Such a false alarm can be effectively and simply eliminated, for example, by comparing two separate retro-reflection measurements obtained with light from (or viewing from) two different angles relative to the object. For this purpose, the retro-reflection meter shown in FIG. 7A can be used. It is provided with two (rather than one as shown in FIG. 1D) light sources 130 and 131, which are alternatively switched on at a switching frequency f. Two light sensors (a and b) 132 and 133, disposed symmetrically-paraxially relative to the two light sources give, as a result of retro-reflection, in combination a fluctuating differential signal (at the frequency f). This combinatory differential signal is compared with the sequential signal fluctuation ($s_{a-b}$) (also at f) of the separate light sensors. This proportionality in the (opposite) signal fluctuations of the two separate light sensors implies an unreliable combinatory differential signal, and such an inequality in fluctuation can (absolutely) be deducted from the combinatory differential signal, such as: $\Delta|(a+b)| - \Delta|(a-b)|$. This correction can be simply effected, for example, by means of signal processing as shown in FIG. 7B.

In an adapted form, this method can also be applied to other retro-reflection detectors according to the present invention. Although it has been described, with reference to FIG. 1C, that the intensity distribution of a retro-reflected beam about its axis of symmetry is generally single-lobed, this intensity distribution may in practice be of more complex form. Such an intensity distribution is commonly not perceivable to the naked eye, and is characteristic of each type of retro-reflector. Variations in the focussing power of, for example, the lens of a lens-retro-reflector give corresponding variations in the spread of the beam. The same applies, for example, to asymmetries in the design of cube-retro-reflectors.

Figure 8:
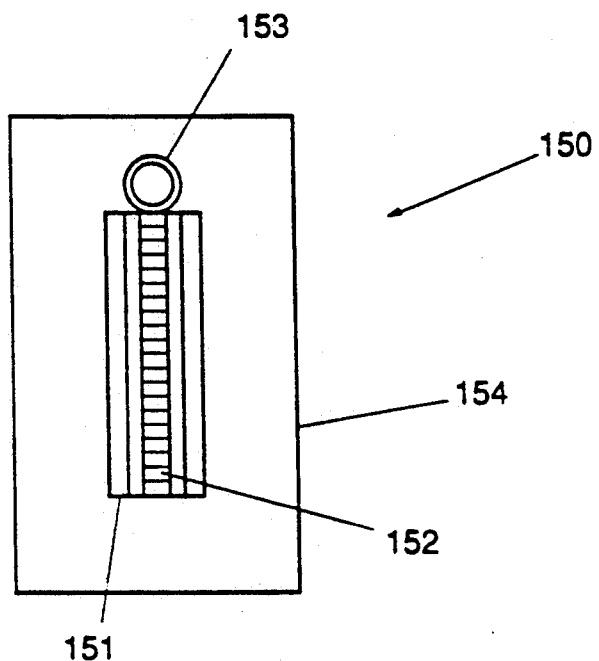
FIG. 8 shows a front-elevational view of an embodiment of a beam profile display device according to this invention.

FIG. 8 shows an extremely simple beam profile display device 150, which is an extension of the apparatus shown in FIG. 1D. In it, the retro-reflection beam is received on a matrix 151 of light sensors 152. The sensor matrix 151 and a spot light source 153 are mounted on a mounting plate 154 next to, and parallel to, each other. The sensor matrix 151 simultaneously registers the intensity of reflected light from more than two angles relative to the main axis. A first differential signal $\phi 12$, obtained between the sensors 51 and 52, is compared with a second differential signal $\phi 13$, obtained in combination with one of the other sensors, for example 53. Thus the characteristic light distribution in the beam from a retro-reflector can be detected, while the effect of random reflections is eliminated.

Figure 9:
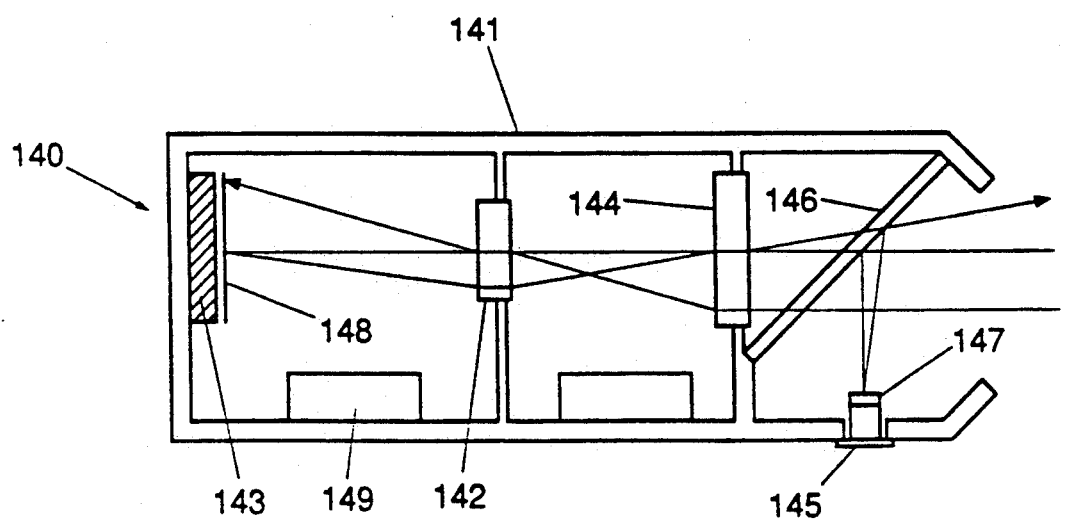
FIG. 9 shows a further embodiment of a beam profile display device according to the invention.

A deluxe embodiment of the apparatus of FIG. 8 is shown in FIG. 9. This beam profile display device 140 comprises a camera 141 with an image forming lens 142, a two-dimensional image sensor 143, such as a video image sensor, at right angles to the optical axis, and a positive collecting lens 144. A diverting spot light source 145 is disposed axially and symmetrically relative to collecting lens 144 by means of a 0 beam splitter 146. The imaging lens 142 is disposed in the focal point of collecting lens 144.

Imaging lens 142 is disposed so that an image of the collecting lens itself is formed in the plane of the image sensor. All other objects will not be pictured or pictured in a blurred image Thus the pattern of a retro-reflected light beam incident upon the surface of collecting lens 144 is imaged (on a smaller scale) on the surface of image sensor 143. (The reduction of the image of the pattern of incident light is $$N = \frac{f_1}{f_1 - f_2}.$$

In it, $f_1$ is the focal distance of the imaging lens and $f_2$ is the focal distance of the collecting lens). This retro-reflection beam pattern can be displayed, for example, on a screen, and can thus be measured or otherwise processed. Light incident upon the collecting lens from aside will not be depicted on the image sensor. The angle of incidence $\alpha$, whithin which a reflector can be detected can be defined as $\tan\alpha = r/f_2$. In it, r is the radius of the imaging lens aperture.

In this way, a retro-reflection beam pattern can be 30 displayed or read with this apparatus, and thus a given retro-reflector can be analysed or recognized. The beam pattern of a reflector having a very weak intensity can be further intensified by means of other signal procedures, such as the method of FIG. 3, temporal integration, etc. Motion of the 35 retro-reflector during beam image recording is permitted by reason of the slight effect thereof.

Relative to apparatus 150, apparatus 140 offers a more complete image, while further the possibility of image enlargement or reduction is offered, and the possibility of staking out the image by limiting the field of view.

Figure 10A:
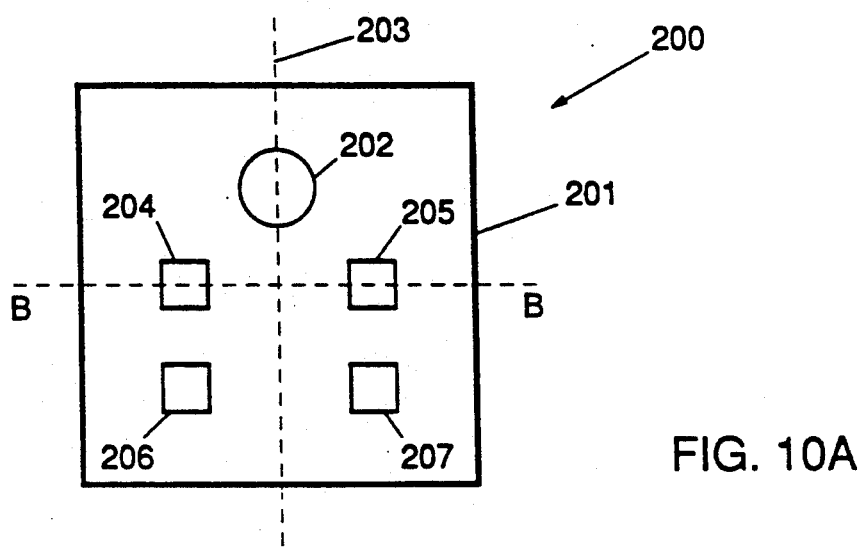
FIG. 10A shows a diagrammatic front-elevational view of a position detector according to this invention.
Figure 10B:
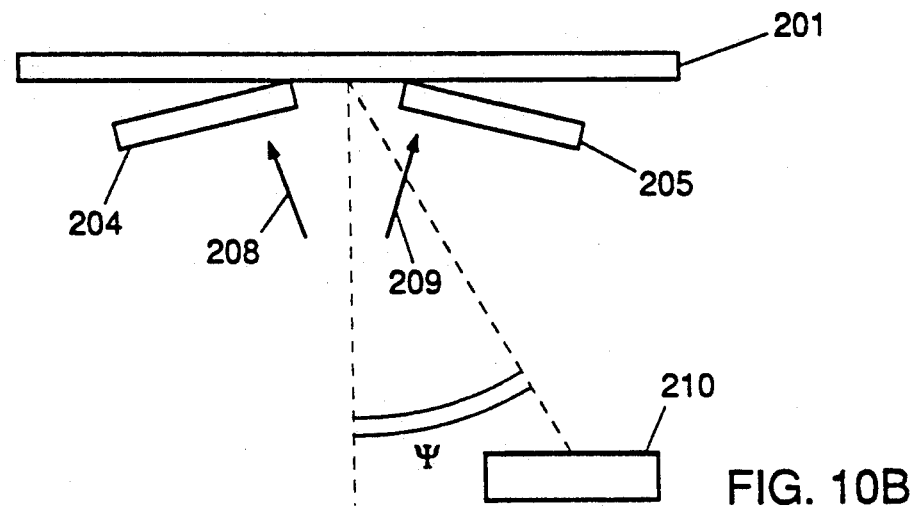
FIG. 10B is a cross-sectional view, taken on the line B—B of FIG. 10A.

FIG. 10A shows a schematic front-elevational view of a position detector 200 according to the invention. Mounted on a carrier 201 is a source of radiation 202 and four detectors 204, 205, 206, 207. Detectors 204 and 206, on the one hand, and detectors 205 and 207, on the other, are symmetrically disposed relative to a central axis 203 extending through the centre of the source of radiation 202. Detectors 204, 205, 206, 207 are so arranged that detectors 204, 206 disposed on one side of the central axis 203 have equally directed detection fields, and that the detectors 205, 207, disposed on the other side of the central axis 203, have equally directed detection fields, the direction of the detection fields of detectors 205, 207 being different from the direction of the detection fields of detectors 204, 206. In the embodiment shown, where the central axis 203 is in a vertical position, detectors 204, 206 are sensitive to radiation coming from the right, as indicated by the arrow 208 in FIG. 10B, and detectors 205, 207 are sensitive to radiation coming from the left, as designated by arrow 209 in FIG. 10B. Such a different directional sensitivity can be obtained, for example, by placing the detectors at a given angle relative to each other, as illustrated in FIG. 10B.

In a similar manner to that described with reference to FIG. 1D, a first differential signal 211 is provided of the radiation received by detectors 204 and 206, which first differential signal 211 is representative of the radiation retro-reflected by an object 210 from the direction 208.

Similarly, a second differential signal 212 is provided of the radiation received by detectors 205 and 207, which second differential signal 212 is representative of the radiation retro-reflected by the object 210 from the direction 209.

Subsequently, a third differential signal 213 is provided, which is the difference between the first differential signal 211 and the second differential signal 212. This third differential signal 213 is representative of the directional angle $\psi$ from which the light retro-reflected by object 210 impinges upon detector 200, in other words, the third differential signal 213 is representative of the horizontal position of object 210 relative to detector 200. Accordingly, the detector 200 can be used as a position detector in one direction.

Figure 10C:
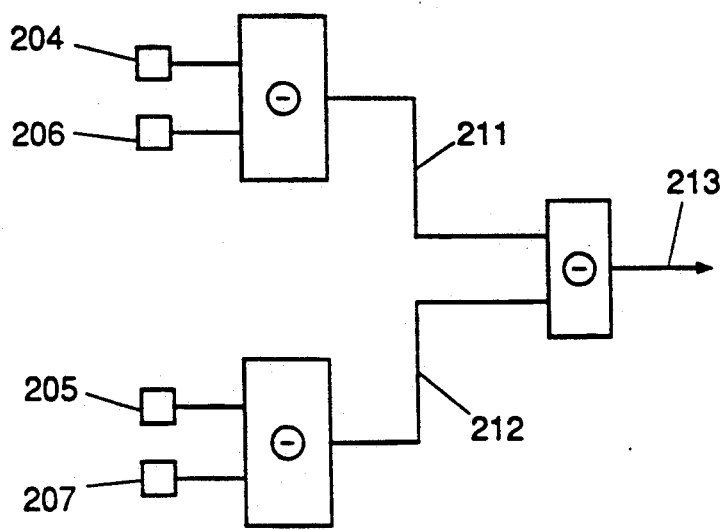
FIG. 10C is a basic diagram for processing the measurement signals obtained with the detector shown in FIG. 10A.

For the sake of clarity, a basic scheme of the above-described signal processing is shown in FIG. 10C.

Figure 10D:
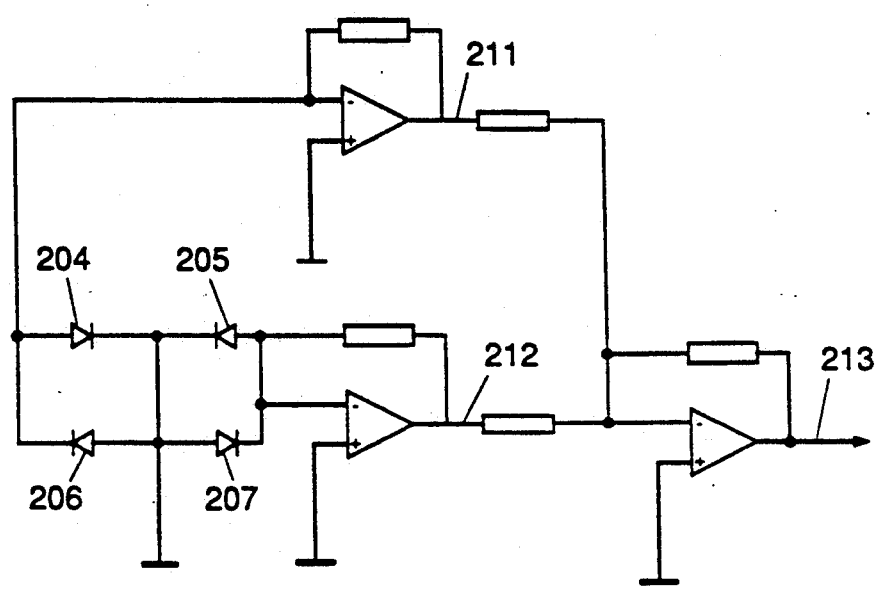
FIG. 10D is a circuit diagram of an embodiment of the diagram shown in FIG. 10C.

FIG. 10D shows a simple practical implementation of the basic scheme shown in FIG. 10C, with the detectors being radiation-sensitive diodes. In FIG. 10D, the radiation-sensitive diodes 204, 205, 206, 207 are shown with the same mutual orientation as the detectors illustrated in FIG. 10A. For simplicity, the embodiment shown in FIG. 10D will not be described in detail herein, as its operation will be sufficiently clear to one skilled in the art from a reading of the above description.

Figure 10E:
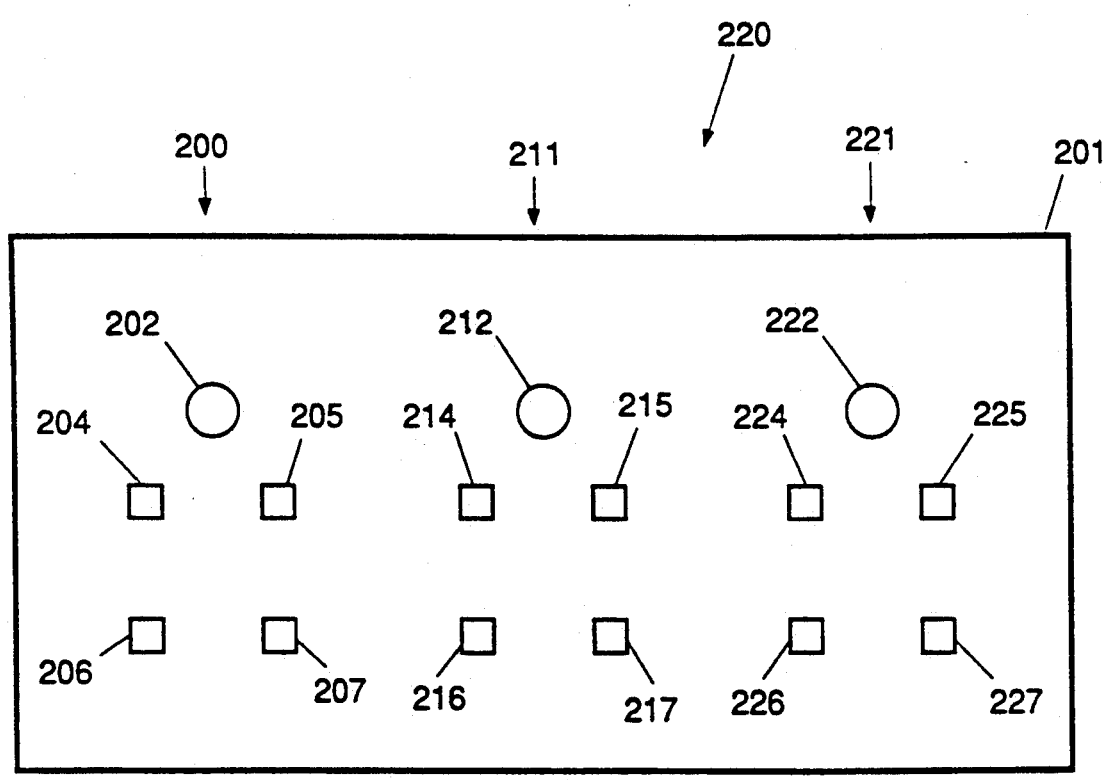
FIG. 10E is a diagrammatic front-elevational view of a further position detector according to this invention.

FIG. 10E shows a diagrammatic front-elevational view of a position detector 220 according to the present invention, which is suitable for use as a detector in two directions. The position detector 220 can be regarded as an extension of the above-described position detector 200, because a further position detector 211 is provided on carrier 201, which comprises a radiation source 212 and four detectors 214, 215, 216, 217, and the operation of which position detector 211 is similar to the above-described operation of position detector 200, with the difference that detectors 214, 216 are sensitive to radiation coming from above, whereas detectors 215, 217 are sensitive to radiation coming from below. Thus position detector 211 provides an output signal representative of the vertical position of object 210 relative to detector 211.

The above-described position detector 220 is therefore a detector which by extremely simple means is capable of providing signals representative of the horizontal or vertical position of a retro-reflecting object relative to detector 220. As the dimensions of this object may be extremely small, the combination of position detector 220 and a retro-reflecting object according to this invention is particularly suitable as an indicator means, in particular as a wireless "mouse" for use with a display screen, for example, connected to a computer.

The apparatus of FIG. 10C illustrates, for one thing, that the invention is very widely applicable, and that, by selective detection, useful information about an object can be obtained with a very simple but reliable apparatus which can function in a wide and unconditioned detection field. In addition to the position detection described herein, distance, orientation and the like can also be detected in a comparable manner.

The position detector 220 illustrated in FIG. 10E is further provided with a further position detector 221, arranged on carrier 201, which comprises a radiation source 22 and four detectors 224, 225, 226, 227, the operation of which position detector 221 is similar to the above-described operation of position detector 200.

In a comparable manner to position detector 200, position detector 221 provides an output signal which is representative of the horizontal position of the object 210 relative to detector 221. As position detector 221 is displaced in a horizontal direction relative to position detector 200, the horizontal position of object 210 relative to detector 221 differs a little from the horizontal position of object 210 relative to detector 200. The magnitude of this difference depends upon the distance of object 210 from detector 220. The position detector 220 illustrated in FIG. 10E is also capable of detecting the distance of object 210.

It will be clear to those skilled in the art that the embodiments of the apparatus according to this invention as described herein and illustrated in the accompanying drawings can be changed or modified without departing from the inventive idea or the scope of protection.

Thus, for example, it will be possible for an object which is not-ideally reflecting, to be detected by exactly detecting the deviation from the ideal angle of reflection and/or angle of rotation.

Also, other uses of the inventive concept are contemplated which are not described separately herein.

It is finally observed that a combination with conventional selective techniques is possible to provide for further selectivity. One example is the provision of colour selectivity by using a colour filter.

I claim:

1. A method of detecting the presence of an object in a three-dimensional space, said object having a part thereof which is retro-reflective, the method comprising the steps of:

generating radiation by means of a source of radiation;

emitting the radiation into the three-dimensional space object along an axis of propagation;

detecting a first radiation component reflected by objects in said three-dimensional space at a first angle of deflection of substantially 180° with respect to the axis of propagation of the radiation emitted into the three-dimensional space;

detecting at least a second component of the reflected radiation at a second angle of deflection which is slightly greater than or slightly less than 180° with respect to the axis of propagation of the emitted radiation; and determining a first differential measurement between a first intensity signal representing the first radiation component and a second intensity signal representing the second radiation component, said first differential measurement indicating the presence of the object in the three-dimensional space.

2. A method as claimed in claim 1, said first and second radiation components comprise radiation having different polarization orientations.

3. A method as claimed in claim 1, and further comprising the step of comparing the radiation components measured at two angles of deflection with respect to the propagation axis but not exactly at the propagation axis so as to determine a beam pattern of a particular reflector in the three-dimensional space.

4. A method as claimed in claim 1, and further comprising filtering by polarizing the reflected radiation.

5. A method as claimed in claim 4, wherein the step of filtering comprises using at least one $\frac{1}{4}\lambda$ platelet.

6. A method as claimed in claim 1, and further comprising the steps of detecting third and fourth reflected radiation components associated with third and fourth slightly different deflection angles, determining a second differential measurement between a third intensity signal representing said third radiation component and a fourth intensity signal representing said fourth radiation component, and comparing the result of the first differential measurement and the result of the second differential measurement to eliminate potential false detections.

7. The method of claim 1, wherein the steps of detecting said first and second radiation components comprises detecting at least one radiation component having a particular orientation with respect to the propagation axis of the emitted radiation.

8. An apparatus for detecting the presence of an object in a three-dimensional space by the reflection of radiation from the object, the apparatus comprising:
at least one source of radiation arranged to transmit along an axis of propagation radiation into a three-dimensional space;
measuring means positioned to receive a first component and a second component of radiation reflected from said three-dimensional space, the first component being at a first angle of deflection of substantially 180° with respect to the axis of propagation of the emitted radiation, the second component being at a second angle of deflection which is slightly less or slightly greater than the first angle of deflection of the first component, said measuring means providing a first intensity signal representing the intensity of said first radiation component and a second intensity signal representing the intensity of said second radiation component.

9. The apparatus as claimed in claim 8, and further comprising at least two sources of radiation.

10. The apparatus as claimed in claim 9, wherein the radiation from the sources of radiation have different polarization orientations.

11. The apparatus as claimed in claim 8, wherein the measuring means.

12. The apparatus as claimed in claim 11, wherein the detectors are sensitive to radiation with different polarization orientations.

13. The apparatus as claimed in claim 8, and further comprising means for performing a further measurement substantially along the propagation axis within a limited detection field in the three-dimensional space.

14. The apparatus as claimed in claim 8, wherein the three-dimensional space is an elongated scanning detection field.

15. The apparatus of claim 8, and further comprising means for determining a first differential measurement between a first intensity signal representing the first radiation component and a second intensity signal representing the second radiation component, said first differential signal indicating the presence of an object in the three-dimensional space.

16. The apparatus of claim 8, and further comprising means for analyzing the polarization orientation of at least one of said radiation components with respect to the polarization of the emitted radiation.

17. The apparatus of claim 8, wherein said measuring means is positioned to receive said second radiation component having at least one particular orientation with respect to said axis of propagation.

18. A system for detecting the presence of an object in a three-dimensional space by the reflection of radiation from the object, the system comprising:
at least one source of radiation arranged to transmit radiation along an axis of propagation into a three-dimensional space;
at least one object movable into said three-dimensional space having reflection means attached thereto, said reflection means having means for controlled rotation with respect to said axis of propagation;
measuring means positioned to receive first and second components of radiation reflected from said three-dimensional space, the first component being at a first angle of deflection of substantially 180° with respect to the axis of propagation of the emitted radiation, the second component being at a second angle of deflection which is slightly less or slightly greater than the first angle of deflection of the first component, said measuring means providing a first intensity signal representing the intensity of said first radiation component and a second intensity signal representing the intensity of said second radiation component.

19. The system of claim 18, wherein the reflection means comprises a retro-reflecting layer.

20. The system of claim 18, wherein the reflection means comprises at least one $\frac{1}{4}\lambda$ layer.

21. The system of claim 18, wherein the reflection means comprises at least one $\frac{1}{2}\lambda$ layer.

22. The system of claim 18, wherein the reflection means comprises an elongated strip of a reflected material having codes thereon lengthwise along the elongated strip.

23. The apparatus of claim 8, wherein the measuring means is positioned at an angle inclined with respect to the axis of propagation of the emitted radiation such that the first and second components represent radiation at slightly offset angles from an angle relative to the axis of propagation.

* * * * *